R. B. WILLIAMSON.
DYNAMO ELECTRIC MACHINE.
APPLICATION FILED APR. 22, 1910.
1,010,998.
Patented Dec. 5, 1911.
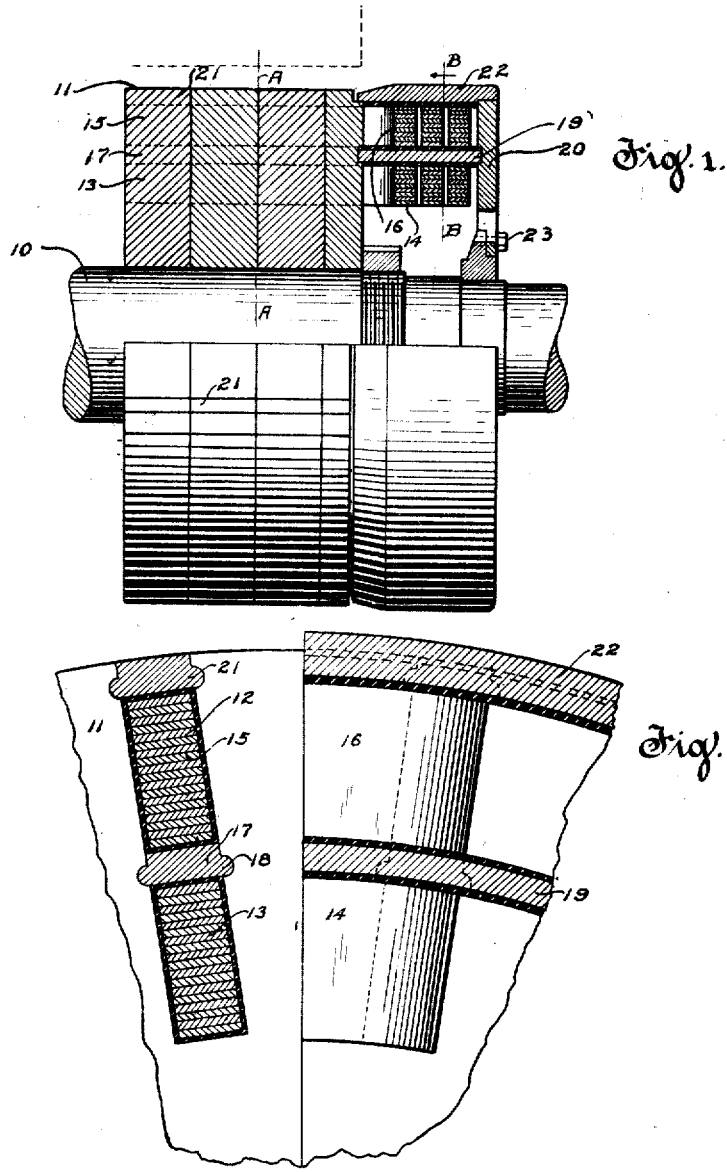

UNITED STATES PATENT OFFICE.

ROBERT B. WILLIAMSON, OF MILWAUKEE, WISCONSIN, ASSIGNOR TO ALLIS-CHALMERS COMPANY, A CORPORATION OF NEW JERSEY.

DYNAMO-ELECTRIC MACHINE.

1,010,998.  Specification of Letters Patent.  Patented Dec. 5, 1911.

Application filed April 22, 1910. Serial No. 556,992.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines, and more particularly to the structure of the rotors of turbo generators.

In the modern turbo generator, the rotor winding, which in alternating current machines is almost universally the field winding, is located in slots in the cylindrical rotor core, the end turns of the winding being located at the ends of the core. These slots in the rotor core are either radial or have a large radial component. On account of the high speed at which turbo generators are operated the centrifugal forces developed in this winding are exceedingly large, so that in order to prevent the rotor winding from being thrown outward very sturdy retaining means must be used. For the parts of the winding which are located in the slots the retaining means usually comprises bars or wedges placed in the slots radially outside of the windings, these bars or wedges fitting in grooves in the sides of the slots; while for the end turns of the winding, which often project beyond the ends of the core, heavy steel rings surrounding such end turns are used. These wedges and rings must be strong enough to withstand the centrifugal forces developed both in themselves and in the winding which they are to retain in place.

As turbo generators have become larger, and in consequence the centrifugal forces developed in their rotor windings have become greater, the retaining means for the windings tend to become disproportionately large.

It is the object of my present invention to provide for retaining the rotor windings in place without the necessity of making such retaining means unduly large. In attaining this object the rotor winding is divided into a plurality of sections one radially outside of the other, and separate retaining means are provided for the several sections of the winding. By this means the centrifugal forces developed in the whole retaining means are diminished, as part of said means is located at a smaller distance from the axis of rotation. Moreover, the inner retaining rings for the end turns, when such rings are provided, have a smaller tendency magnetically to short-circuit the field developed, as the retaining rings for the end turns of the inner parts of the winding are adjacent to the points on the rotor core between which there is smaller difference of magnetic potential than there is between corresponding points near the periphery.

My invention, while thus particularly applicable for rotors, whether they be field or armature members, may also be used advantageously in many cases in stators; and while especially suitable for large machines, is also often desirable in smaller machines.

The various novel features of my invention will appear from the description and drawings and will be particularly pointed out in the claims.

Figure 1 is an elevation, partly in section, of part of a turbo rotor embodying my invention; Fig. 2 is a fragmentary sectional view, taken partly on the line A—A and partly on the line B—B of Fig. 1.

On the rotor shaft 10 is mounted the rotor core 11, which preferably consists of a series of steel plates. The core is provided with longitudinal slots 12 in which are located the longitudinal parts of the rotor winding, the usual end turns of the winding being here located beyond the ends of the core 11. The rotor winding, which preferably consists of edgewise wound copper strip, is divided into sections, here shown as two in number. The inner section consists of the longitudinal parts 13 and the end turns 14; the outer section, which is located radially outside of the inner section, of the longitudinal parts 15 and the end turns 16. The parts 13 of the winding are held in place against the action of centrifugal force, by bars or wedges 17, which are provided in the usual manner of such wedges with projections 18 fitting in grooves in the sides of the slots 12. The end turns 14 at each end of the core are held in place by a steel ring 19, which preferably engages in grooves in the end of the core 11 and in an end plate 20. The wedges 17 and the rings 19 are placed in position after the inner section but before the outer section of the winding. The longitudinal parts 15 are held in place by wedges 21, similar to the wedges 17 and similarly interlocking with the sides of the slots. The end turns 16 at each end of the core are supported against centrifugal force by the retaining ring 22, which is concentric with the ring 19 and surrounds such end turns 16, preferably resting in a groove at the edge of the end of the core 11 and upon the outer edge of the end plate 20. The wedges 21 and the rings 22 are put in place after the completion of the entire winding, and then the end plates 20 are put in place, and fastened as by screws 23. The wedges 21 and the retaining rings 22 may be much smaller than if the wedges 17 and rings 19 were not used, the saving in the weight of the former parts being greater than the weight of the latter parts because of the more advantageous location of such former parts in respect to the effects of centrifugal force. Moreover, the rings 20, being at some distance from the periphery of the rotor, interconnect points of the rotor core between which there is a smaller difference of magnetic potential than there is between corresponding points at the periphery, thus decreasing the loss in the effective field flux both by reason of their more advantageous position magnetically and by reason of their allowing the outer retaining rings 22 to be made smaller and therefore of greater reluctance. The structures at the two ends of the rotor are identical. The number of sections into which the winding may be divided may be anything desired and depends largely on the size of the machine.

Many modifications may be made in the precise form and arrangement shown and described, and all such which do not depart from the spirit and scope of my invention I aim to cover in the following claims.

What I claim as new is:

1. In the rotor of a dynamo-electric machine, a core provided with slots, a winding located in said slots and projecting beyond the ends of the core, said winding being divided into sections located at different distances from the axis of rotation, separate wedges for holding in place in each slot those parts respectively of the several sections of the winding which are located therein, and separate retaining rings for holding in place those parts respectively of the several sections of the winding which project beyond the ends of the core.

2. In the rotor of a dynamo-electric machine, a core provided with slots, a winding located in said slots and projecting beyond the ends of the core, the projecting parts of said winding being divided into sections one radially outside of another, wedges for holding in place the parts of the winding which are located in the slots, and a retaining ring for holding in place each section of the parts of the winding which project beyond the ends of the core.

3. In a dynamo-electric machine, a slotted core, a winding in the slots of said core and projecting beyond an end of the core, the projecting parts of said winding being divided into radially separated sections, and a plurality of concentric retaining rings, one for each of said sections.

4. In a dynamo-electric machine, a slotted core, a winding located in the slots of said core and projecting beyond the ends of said core, the projecting parts of said winding being divided into sections which are of different depths of the slots, and separate retaining means for holding each of said sections in place.

Milwaukee, Wisconsin, April 13, 1910.

In testimony whereof I affix my signature, in the presence of two witnesses.

ROBERT B. WILLIAMSON.

Witnesses:
CHAS. L. BYRON,
GEO. B. SCHLEY.